July 26, 1932. G. H. EMERSON 1,869,309
SINGLE DRUM LOCOMOTIVE BOILER
Filed Jan. 14, 1931 11 Sheets-Sheet 1

Inventor
George H. Emerson
By Erwin S. Clarkson
Attorney

July 26, 1932. G. H. EMERSON 1,869,309
SINGLE DRUM LOCOMOTIVE BOILER
Filed Jan. 14, 1931 11 Sheets-Sheet 2

July 26, 1932. G. H. EMERSON 1,869,309
SINGLE DRUM LOCOMOTIVE BOILER
Filed Jan. 14, 1931 11 Sheets-Sheet 4

July 26, 1932.　　　G. H. EMERSON　　　1,869,309
SINGLE DRUM LOCOMOTIVE BOILER
Filed Jan. 14, 1931　　　11 Sheets-Sheet 6

Inventor
George H. Emerson
By [signature]
Attorney

July 26, 1932. G. H. EMERSON 1,869,309
SINGLE DRUM LOCOMOTIVE BOILER
Filed Jan. 14, 1931 11 Sheets-Sheet 7

July 26, 1932. G. H. EMERSON 1,869,309
SINGLE DRUM LOCOMOTIVE BOILER
Filed Jan. 14, 1931 11 Sheets-Sheet 8
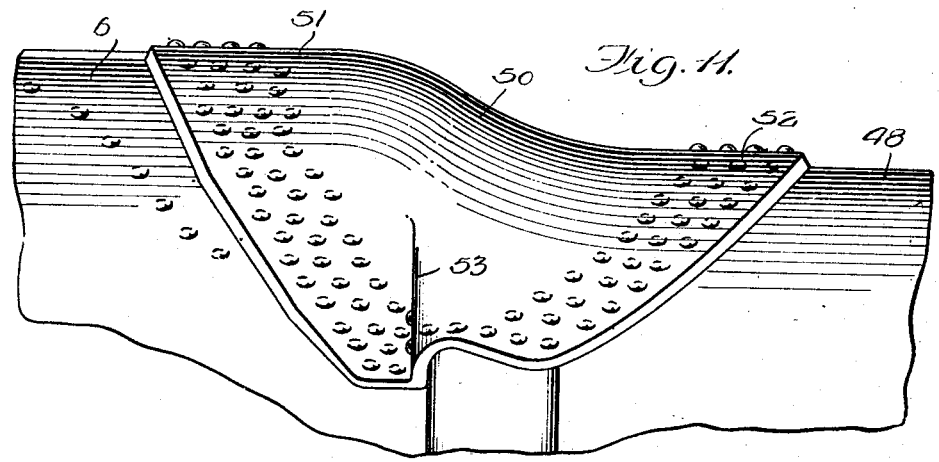
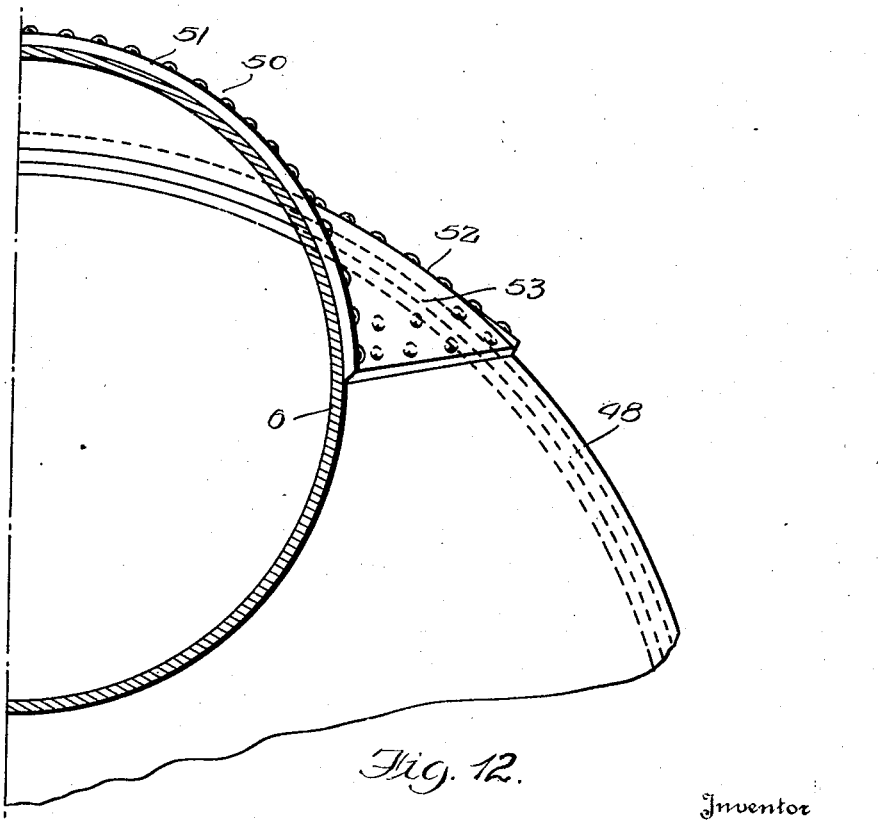

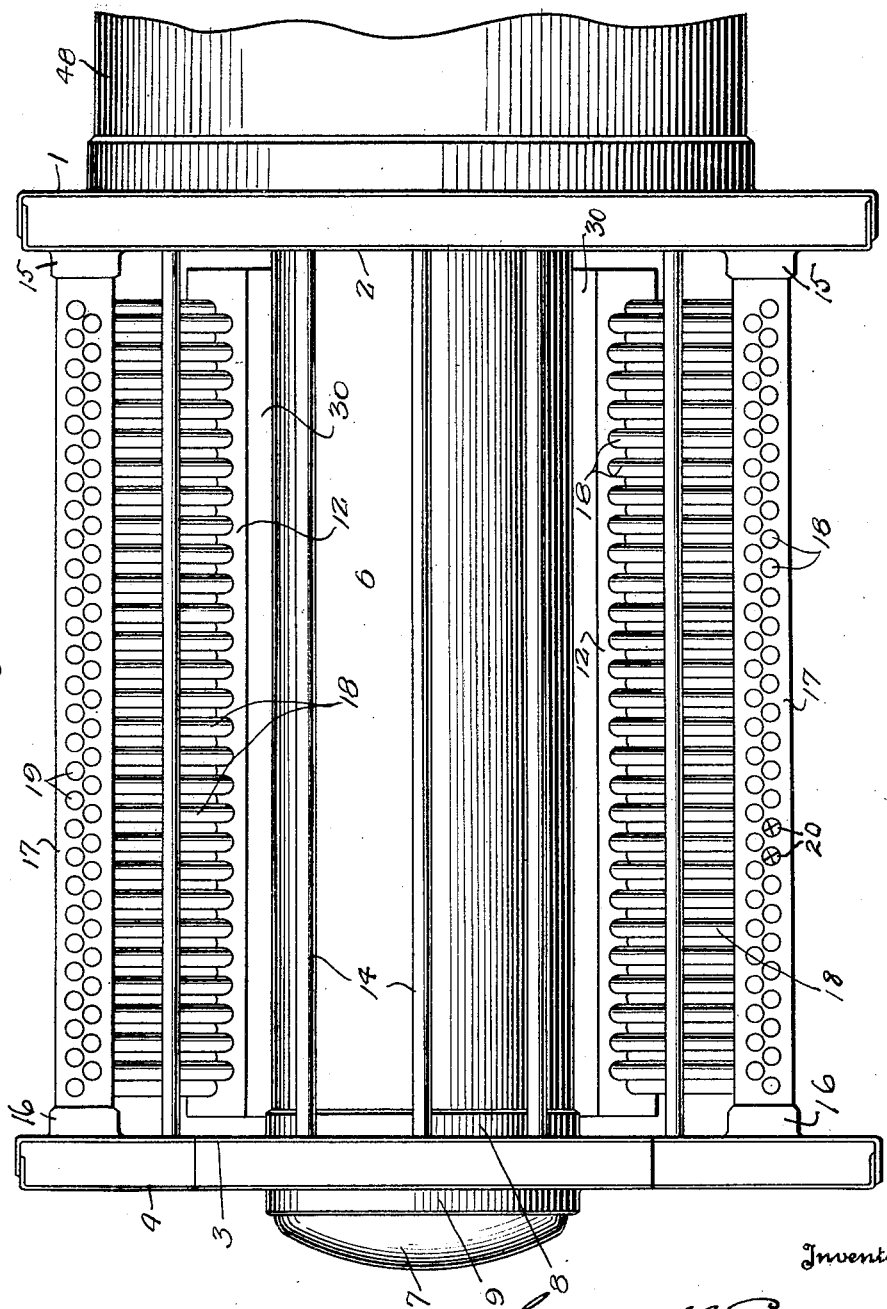

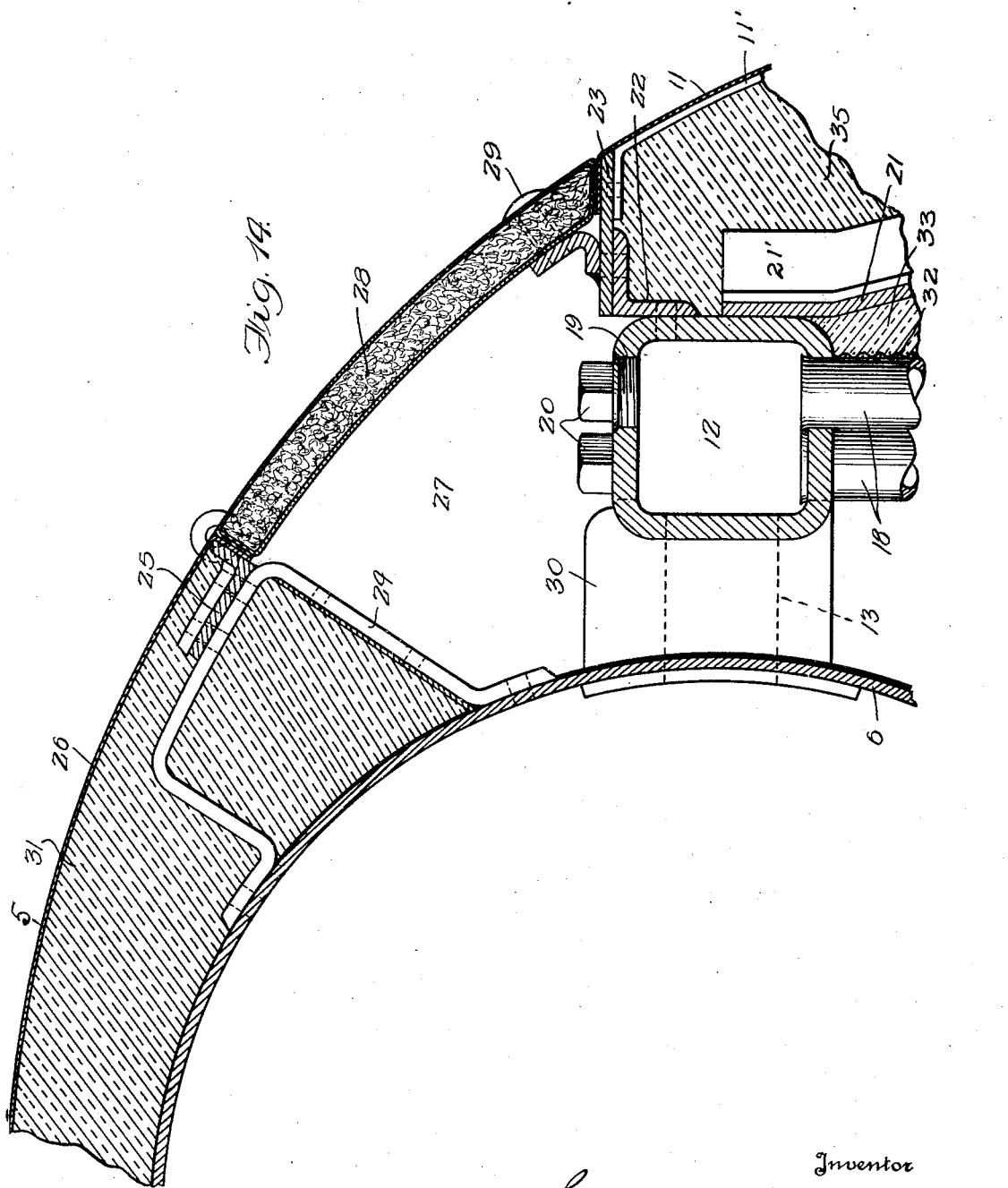

July 26, 1932. G. H. EMERSON 1,869,309
SINGLE DRUM LOCOMOTIVE BOILER
Filed Jan. 14, 1931 11 Sheets-Sheet 11

George H. Emerson
By Selwin S. Clarkson
Attorney

Patented July 26, 1932

1,869,309

UNITED STATES PATENT OFFICE

GEORGE H. EMERSON, OF BALTIMORE, MARYLAND

SINGLE DRUM LOCOMOTIVE BOILER

Application filed January 14, 1931. Serial No. 508,768.

This invention relates to improvements in the fire-boxes of boilers, and particularly to locomotive fire-boxes of the water tube type.

In my Patent No. 1,771,291, dated July 22, 1930, I have shown a water tube fire-box boiler in which the top of the fire-box is formed by a pair of drums, one located on each side of the longitudinal center of the fire-box, and in which the respective side walls of the fire-box are formed by upper and lower headers and vertically disposed circulating tubes connected therewith, each upper header being connected with the drum at its side of the fire-box, so that a circulation is established between each drum and the headers and tubes at each side of the center of the fire-box.

This patented construction provides a very efficient construction of water tube fire-box boiler, furnishing materially increased fire-box evaporation over conventional types of boilers, a very rapid circulation of the water, and a very high ratio of heat transfer, because of the fact that the water circulating in the headers and vertical tubes is broken up into relatively small particles and thus heated more rapidly and to a higher degree in its travel.

Practical experience in the use of this patented structure on locomotives of the Baltimore & Ohio railroad, however, has shown that the use of two or more drums at the top of the fire-box is unsatisfactory and objectionable in certain respects. The use of a plurality of drums requires the closure of the space or spaces between the drums by means of fire-brick which must be tight at all times in order to prevent air from getting into the fire-box and to keep the intense heat from the fire-box from coming in contact with the outside jacketing of the boiler. Since the fire-bricks between the drums are at all times in contact with the direct heat of the fire, and since the temperature at this point when the locomotive is working hard is approximately between 2800° and 3000° F., it has been found impossible to find a suitable fire-brick which will stand such an intense heat for a period of more than two months at a time, thus necessitating frequent renewals at a considerable cost and during which the locomotive is out of service.

Another objection to prior fire-boxes of this type is that with the use of drum supporting flanges of ordinary type on the rear flue sheet, which are extended rearwardly so as to be located in the fire zone, fire cracks are liable to occur from the direct action of the fire-box radiant heat to which the metal surfaces are directly exposed, and which is always more liable to result where two thicknesses of metal are in direct contact and exposed directly to the intense heat of the fire.

Still another objection to boilers of this type as heretofore constructed is that it has been found difficult to make a permanently tight connection between the drum and supporting flange of the rear flue sheet.

One object of my invention is to provide a water tube fire-box construction employing but a single drum, and in which the drum and associated water circulating and steam generating elements are so constructed, combined and arranged as to eliminate the objections to the use of a plurality of drums without reducing the steam generating capacity of the boiler, but on the contrary with the effect of increasing the steam generating capacity of the boiler while at the same time obtaining greater simplicity and giving greater strength and durability to the fire-box structure.

A still further object of the invention is to provide a novel and improved combination of drum supporting flange on the rear flue sheet and means for caulking the space between the drum and said flange, whereby liability of fire cracking of the metal at this point is prevented or to a maximum extent reduced, and whereby a permanently tight sealing connection between the drum and flange will be maintained.

A still further object of the invention is to provide a novel construction and arrangement of a steam generating drum and headers associated therewith, insulating means and cleanout means at the top of the firebox shell, whereby provision is made for locating all of those steam generating elements located at the top of the firebox wholly within the plane of the firebox shell for their better protection, and whereby the drum may be so disposed with relation to and insulated from the crown of the shell as to confine the heat within the firebox chamber and concentrate the heat at the top of the firebox against the drum and headers, thereby preventing undue loss of heat by convection and radiation to the atmosphere through the shell crown and increasing the steam generating capacity of such steam generating means.

A still further object of the invention is to provide a novel construction of joint connection including a hip or bridge sheet for closing the opening between the drum and the barrel part of the boiler shell in an effective manner, and at the same time serving as a stiffener for the entire rear water tube section of the boiler.

A still further object of the invention is to provide novel and improved jacket and cab supporting sheets at the front and rear of the fire-box respectively.

A still further object of the invention is to provide a single drum fire-box water tube boiler which gives maximum simplicity of construction, with greatly increased fire-box evaporation, without increasing the area of the fire-box.

In the drawings:—

Fig. 8 is a vertical longitudinal section through the drum and a part of the barrel, showing the joint connection closing the opening between the same.

Figs. 9 and 10 are cross-sections on lines 9—9 and 10—10 of Fig. 8.

Fig. 11 is an enlarged side elevation of parts shown in Fig. 8.

Fig. 12 is a rear elevation of the same.

Fig. 13 is a bottom plan view of the firebox showing the bottom circulating member.

Fig. 14 is an enlarged transverse section through one side of the drum and the adjacent side of the fire-box, showing the upper header and one of the doors for admitting access thereto.

Figure 1:
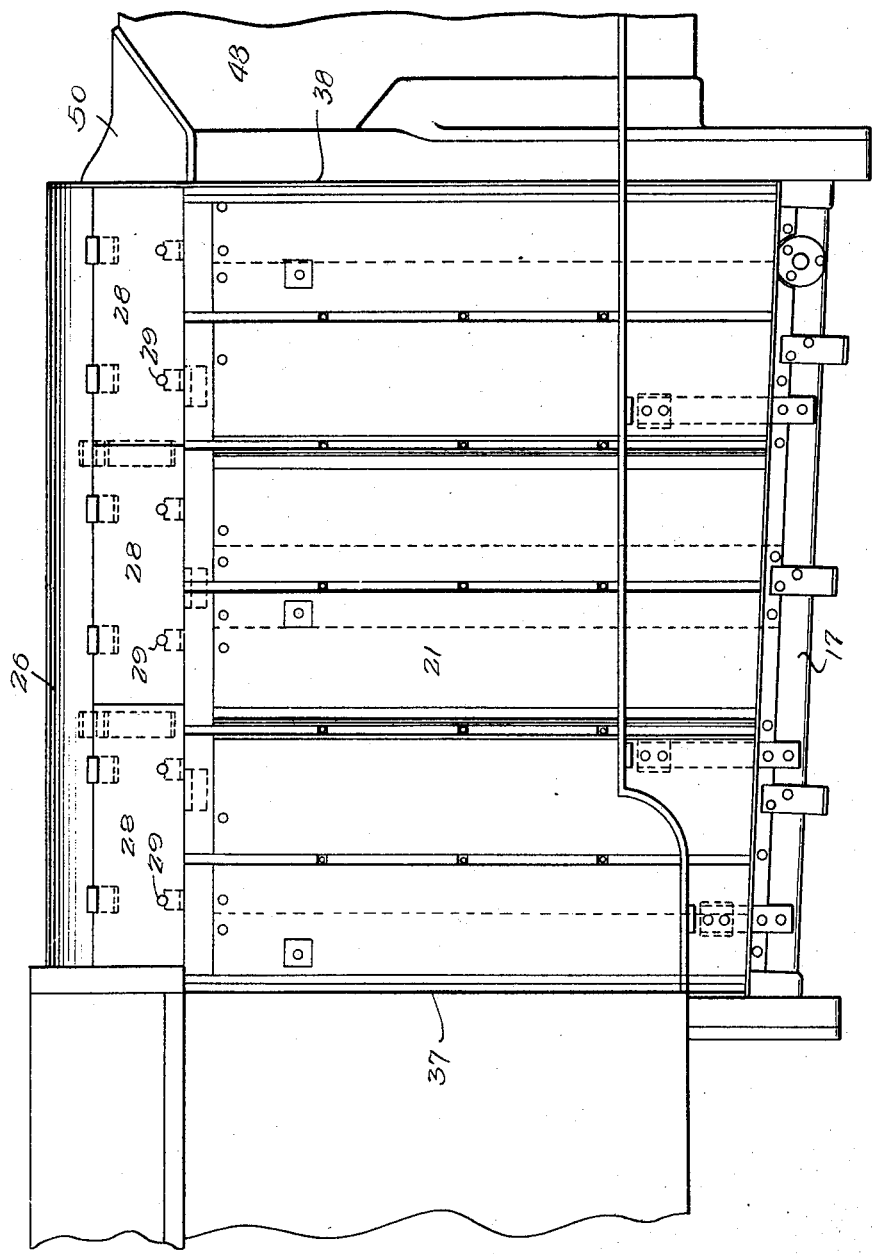
Fig. 1 is a side elevation of a locomotive (parts omitted) embodying my invention.
Figure 2:
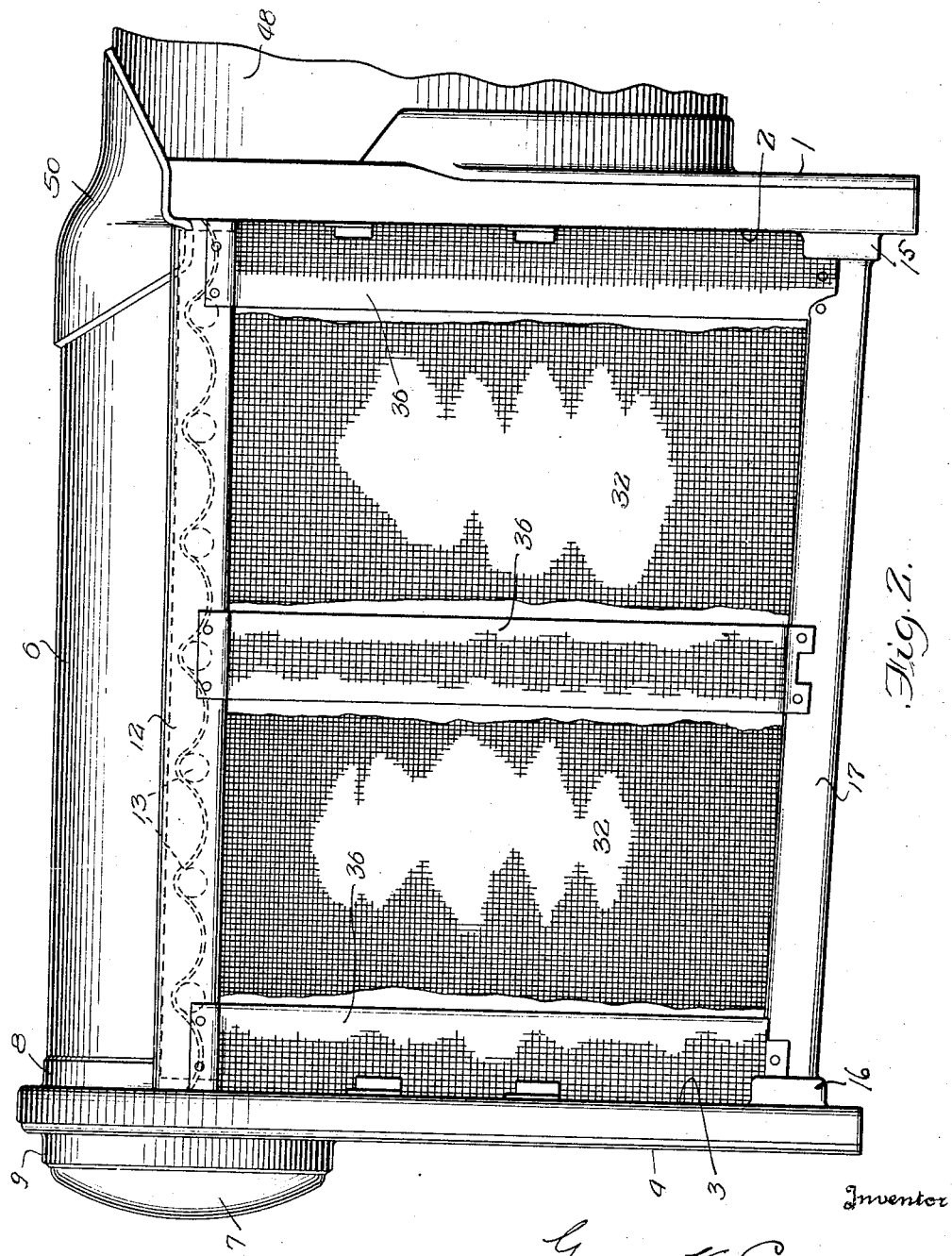
Fig. 2 is a similar view with the cab and side wall of the jacket at one side of the firebox and other parts omitted and the cover sheets partially broken away.
Figure 3:
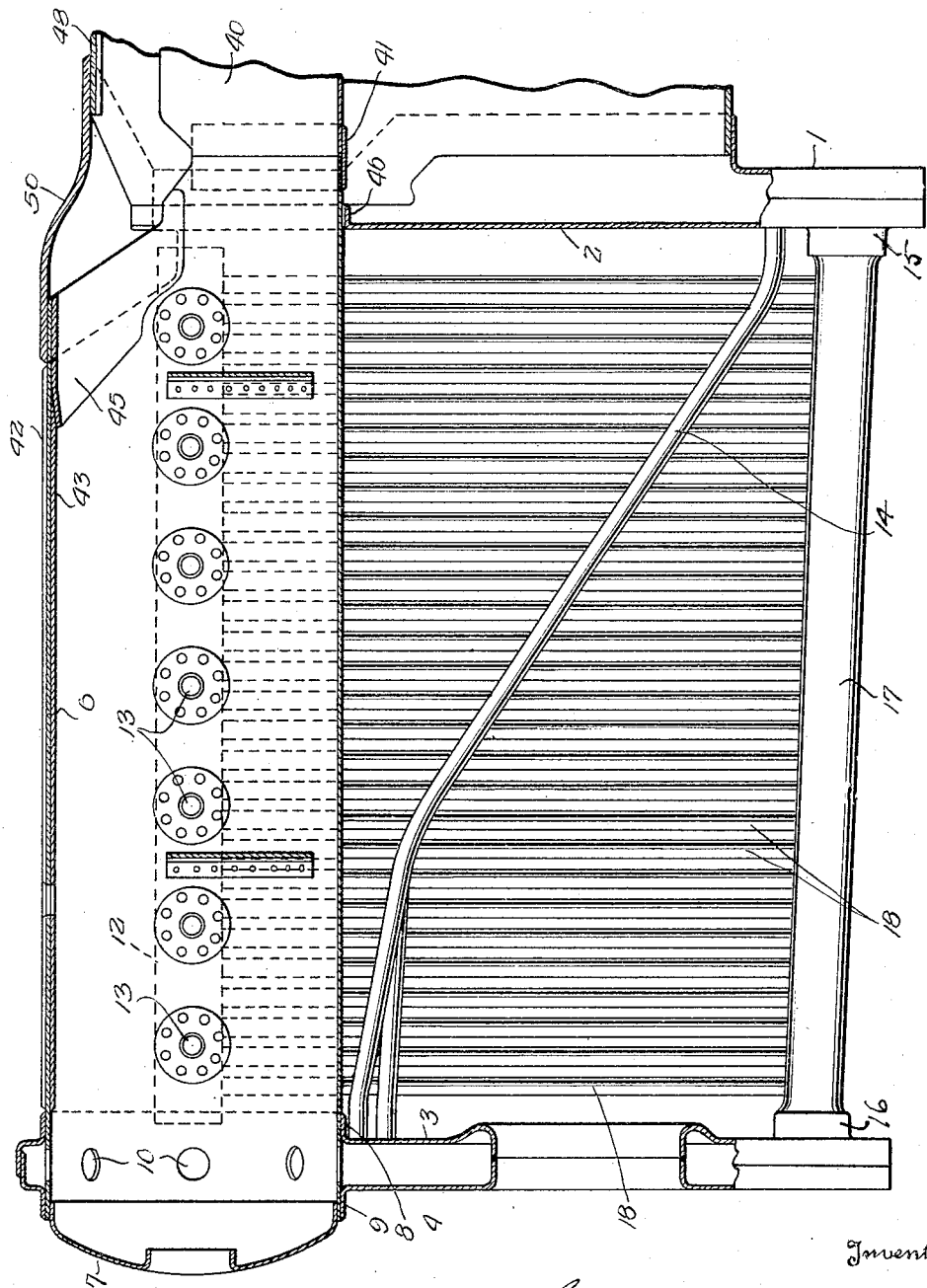
Fig. 3 is a vertical longitudinal section through the fire-box.
Figure 4:
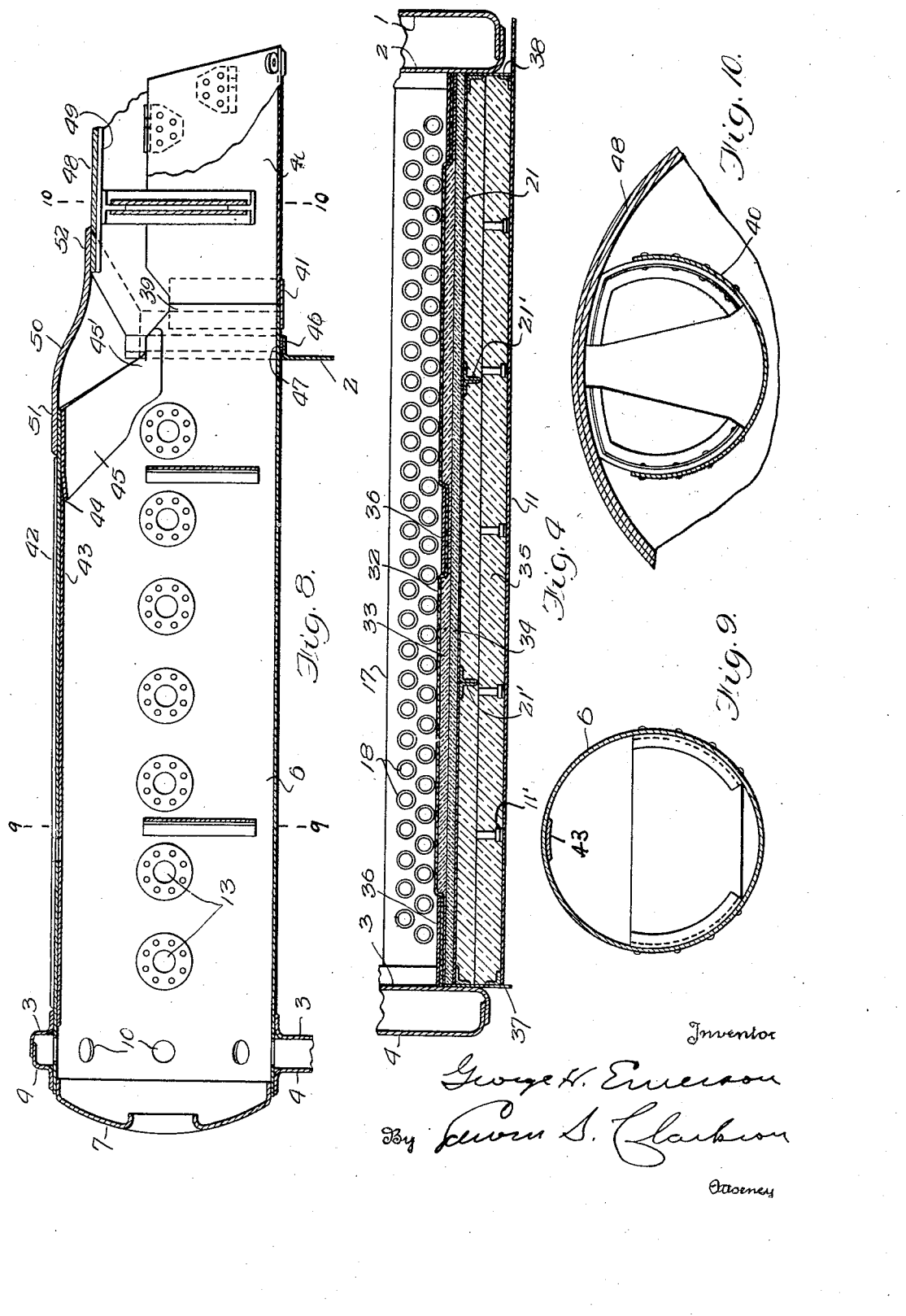
Fig. 4 is a horizontal transverse section through the fire-box on line 4—4 of Fig. 7.
Figure 5:
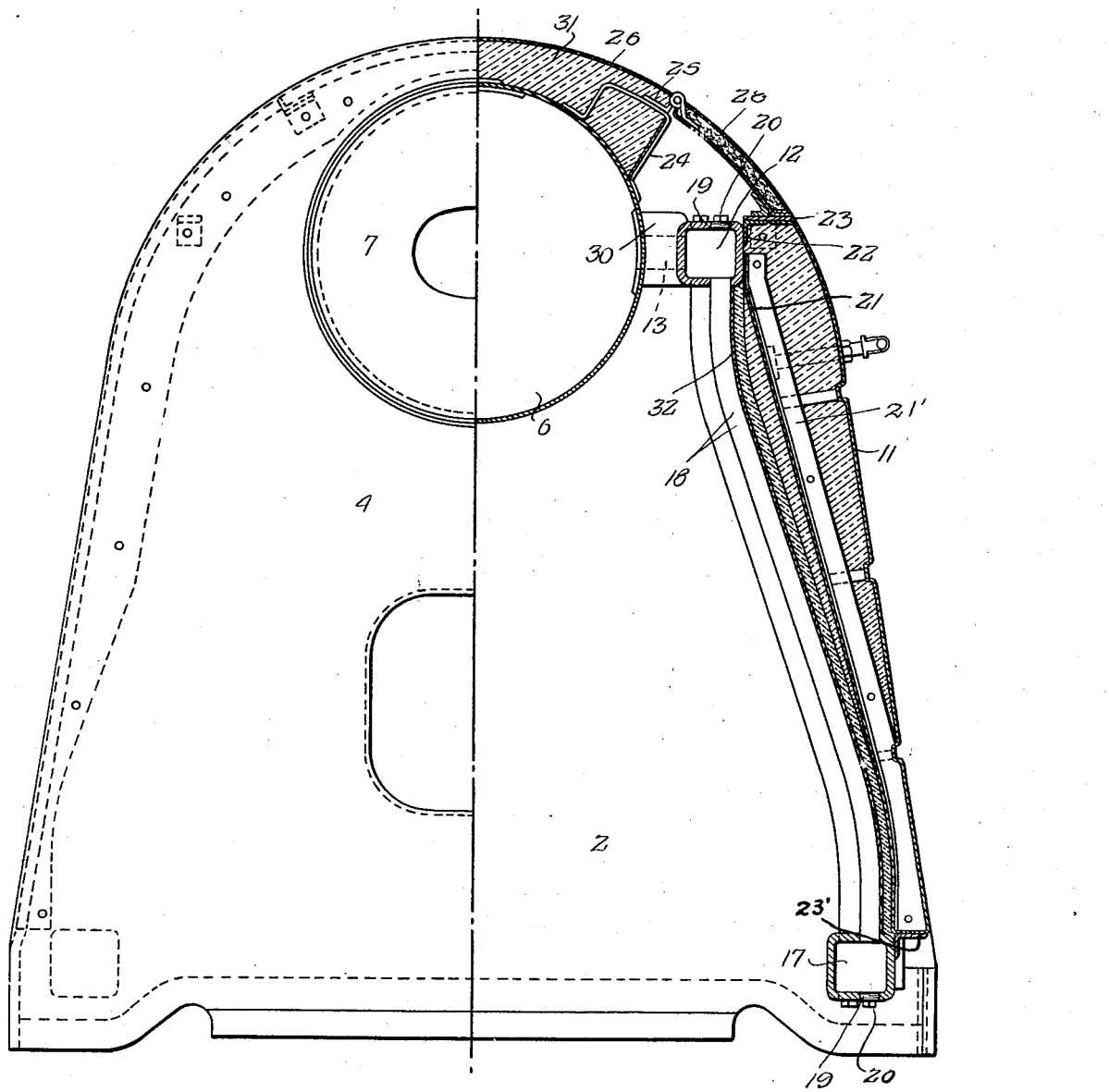
Fig. 5 is a view showing the fire-box partly in rear elevation and partly in vertical transverse section.
Figure 6:
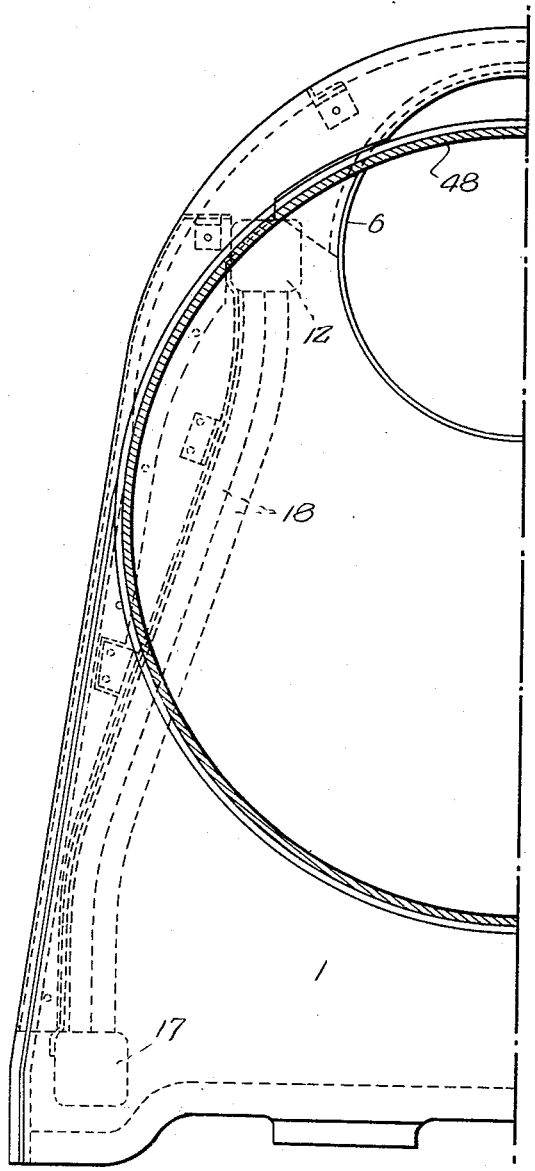
Fig. 6 is a transverse section through the barrel looking toward the throat sheet.
Figure 15:
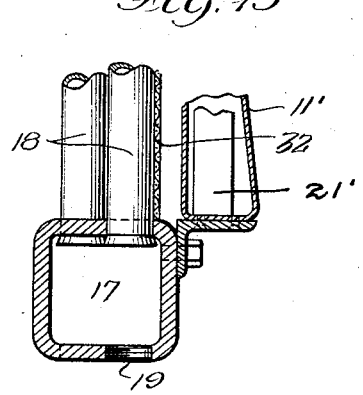
Figure 7:
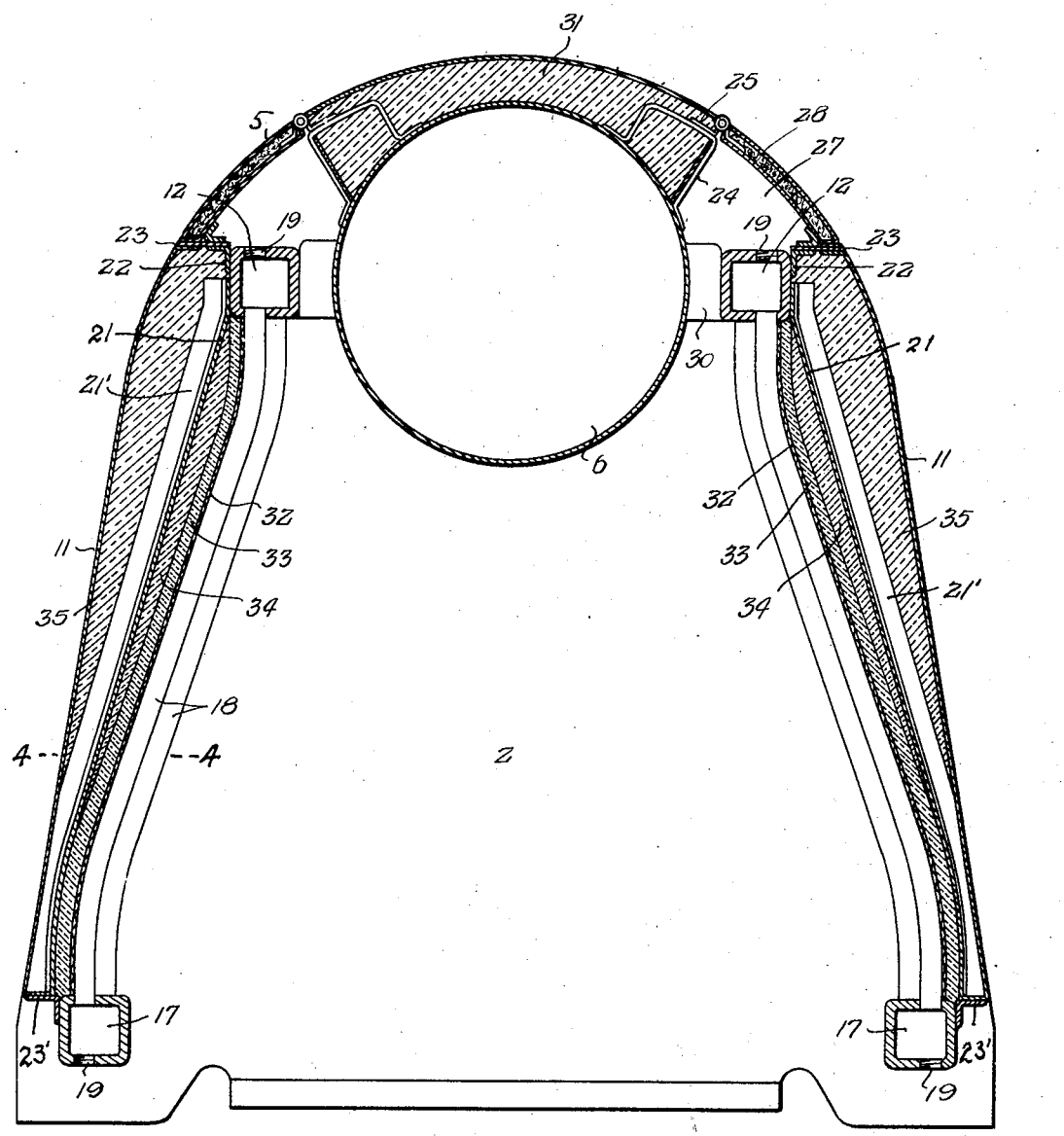
Fig. 7 is a vertical transverse section through the fire-box, omitting the grate.

Fig. 15 is a similar section at the bottom of the fire-box illustrating features of construction in connection with the lower header.

Figure 16:
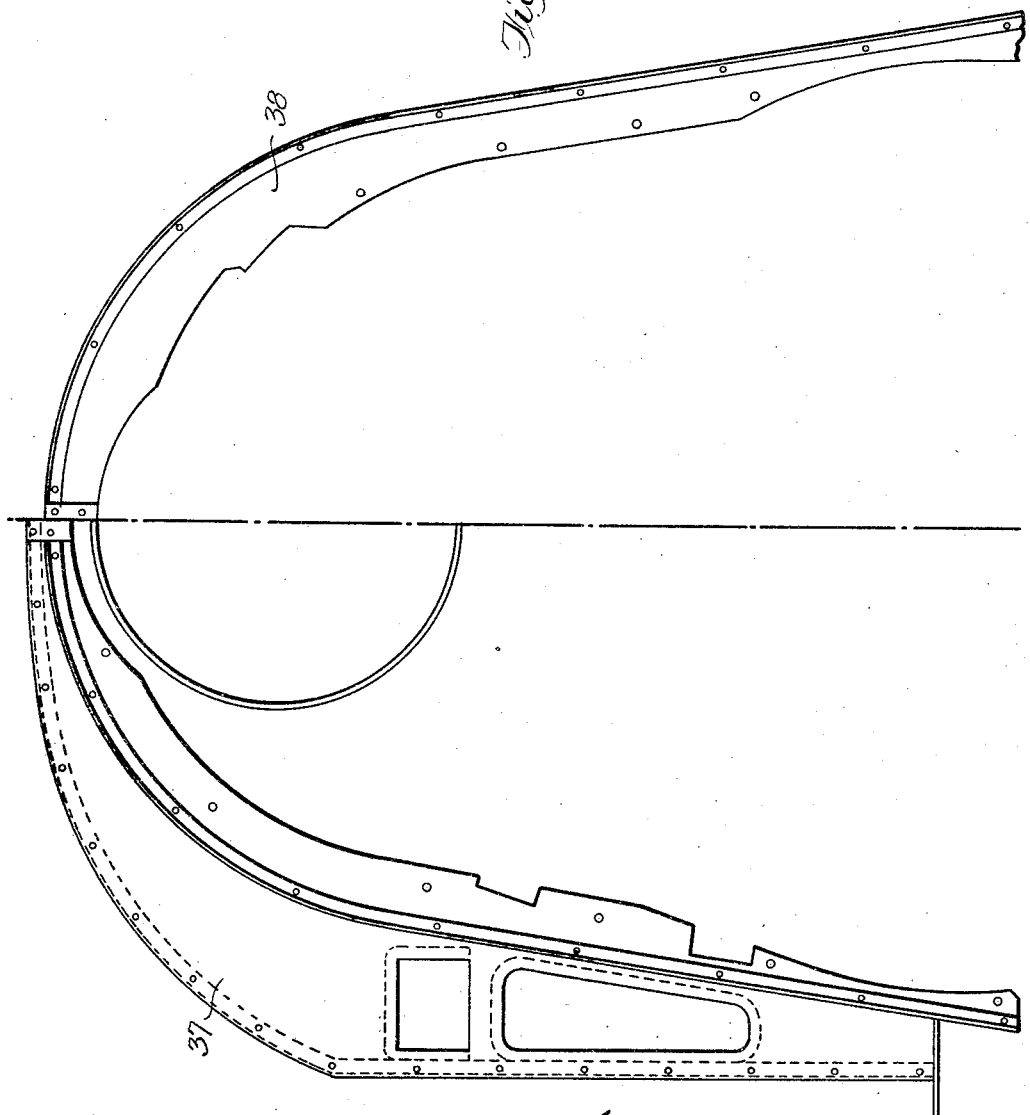

Fig. 16 is a view showing the supporting sheet at the front of the fire-box.

My improved water tube fire-box consists of a throat sheet 1, back flue sheet 2, door sheet 3, back head 4 and jacket 5. Extending centrally and longitudinally of the firebox is a drum 6, which extends at its forward end through the sheets 1 and 2 into the barrel and at its rear end through the sheet 3 and back head 4. The rear end of the drum is closed by a head 7. Said end of the drum is supported by seat flanges 8 and 9 extending forwardly and rearwardly, respectively, from the sheet 3 and back head 4. In this part of the drum are openings 10 for connecting the same with the water leg or space between the door sheet and back head.

Disposed in the spaces between the sides of the drum and the side walls 11 of the jacket are upper headers 12, which are connected with the drum by circulating tubes 13. In the fire-box are the arch water tubes 14 connected at their front and rear ends respectively with the flue sheet 2 and door sheet 3. These tubes 14 in addition to their function as circulating tubes constitute a support for the brick arch. Also connected as at 15 and 16, respectively, to said sheets 2 and 3 are longitudinally extending water legs or bottom headers 17 which are disposed adjacent to the sides of the bottom of the fire-box and beneath the top headers 12.

Connected to and in constant open communication with the top headers 12 and the bottom headers 17 are vertical water circulating tubes 18 arranged in staggered relation, said tubes 18 forming the sides of the fire-box. These tubes are fitted and rolled or beaded or otherwise secured at their upper and lower ends in the headers 12 and 17, which headers are respectively provided in their top and bottom walls with openings 19 normally closed by screw plugs or other suitable closures 20, whereby the ends of the tubes are exposed, allowing the ends of the tubes to be rolled or beaded in and said tubes to be cleaned or washed out when required by means of a suitable washout device, without the necessity of a workman getting inside the boiler.

The headers 12 are disposed in the spaces between the drums 6 and the cover sheets 21 substantially in the plane of the horizontal center of the drum and are fastened to the drum 6 by the circulating tubes 13 and by angle brackets 22 to beams 23 to which are secured the side walls 11. Brackets 24 fastened to the drums are also fastened to beams 25 which carry and to which is secured the crown sheet 26 of the jacket 5. The cover sheets 21 are secured to the brackets 22 or headers 12 and to beams 23' fastened to the lower headers 17, and these sheets are reinforced by stiffener angles 21'. Strips 11' fastened to the beams 23 and 23' are provided for securing the jacket sheets 11 in place. Between the beams 23 and 25 openings 27 are formed in the arched crown of the boiler between and at the juncture of the crown sheet with the side walls, which openings, therefore, are located in vertical planes between the drum and side walls 11 and so as to overlie the upper headers 12. Through these openings the upper headers may be exposed so as to be readily and conveniently reached by a workman standing on the running board, thus allowing ready and convenient repairing or cleaning out of the tubes, as previously described, without the necessity of the workman entering the boiler. Doors 28 are provided to close the openings 27 and these doors are hinged at their upper edges to the beam 25 and are adapted to be secured in closed position by fastening screws or bolts 29 to the beam 23, so that the headers and contiguous parts may be normally concealed, insulated, and protected from injury. The spaces between the tubes 13, and also between the headers 12 and the sides of the drum, are closed by fire-brick 30, and the space between the top of the drum and the crown of the shell is filled with a body of magnesia or other suitable insulating material 31.

It will be seen from the foregoing that the drum 6 is so positioned that its sides face the beams 22, which beams, the headers 12 and the fire brick 30, lie in a horizontal plane substantially coincident with the horizontal center of the drum and the level of the upper edges of the side walls 11, that the openings 27 are formed in the sides of the arch defined by the crown of the shell and lie between the beams 23 and sides of the insulating lining 31, that spaces or passages 23ª are thus provided above the headers 12 and between the same and the openings 27, the walls of which are formed by the sides of the drum, the beams 23 and insulation 31, headers 12 and fire-brick 30 and the doors 28, when said doors are closed. These passages give free access to the headers from above, when the doors 28 are open, so that the drums and fire-brick 30 are fully exposed for inspection, repairs and tube cleaning actions. As a result of this arrangement, the space between the drum and crown of the firebox shell is sealed and insulated by the insulating material 31 against heat losses, while the headers and fire-brick 30 close the spaces between the sides of the drum and firebox shell and the firebox chamber and passages 23ª; thus enabling the drum to be centrally positioned at the top of the firebox and the spaces about the same and the firebox shell to be closed so that the heat from the flames and products of combustion will be concentrated against the entire lower half of the drum and the upper headers and sets of circulating tubes. By this arrangement, also, the headers 12 are located inside the firebox shell below the upper edges of the sides of the shell and about midway between the drum 6 and walls 11, giving greater space for the reception of the cover sheets, the frame elements for supporting and reinforcing the same and the walls 11 and the insulating material, so that stronger and better insulated side walls may be provided and all parts more effectually covered and located within the line of the shell so as to be better protected against possibility of accidental injury.

The spaces between the cover sheets and the tubes 18 are closed by an insulating layer formed of steel netting 32 over which is plastered a plastic fire-brick composition 33 between which and the cover sheet is a layer of plastic magnesia 34, the outside of the cover sheet being provided with a covering of block magnesia 35. Embedded in the plastic insulating material at the front end, rear end and center of the fire-box are reinforcing plates of Ascoloy steel, or other special high heat resisting steel, 36, which anchor the plastic insulating material and give increased strength to the covering. At the rear of the fire-box is a vertical transverse sheet 37, which is fastened to sheet 3 and has secured thereto the jacket sheets 11 and 21, and serves the double purpose of forming the front wall of the cab and a closure plate for closing up the spaces at the rear of the covering and provides a finishing wall for closing any openings which would otherwise exist in the side insulating spaces at the rear of the firebox and in front of sheet 3. This front cab sheet, to which the cab roof and sides are directly bolted, is a fixed part of the fire-box, so that in removing the cab it is simply necessary to disconnect the bolts, thus obviating the necessity of also removing the front cab wall. With this construction any pipes, valve spindles or other accessories extending through this cab wall do not have to be molested in order to remove the cab, thus saving considerable time and labor in assembling, disassembling and repair operations. At the front of the fire-box there is provided a vertical transverse supporting sheet 38, which has an outline of the same contour as the sides of the fire-box jacket sheets, which supporting sheet is fastened to the sheet 2 and has secured thereto the jacket sheets 11 and 21 and thus forms a framework to support said jacket sheets 11 and 21 and also close up any openings which would otherwise exist at the rear of sheet 2 in the side insulating spaces at the front of the fire-box. As shown, the sheets 27 and 28 project marginally beyond the rear and front firebox walls formed by the pairs of sheets 3, 4 and 1, 2 so as to allow the sides and roof of the cab to be fastened to the sheet 37, as set forth, and to support the walls 11 in such relation with respect to the sheets 21 as to provide side insulating spaces of requisite width to secure maximum protection against heat losses.

The drum 6 is cut away on a downward and forward slope or bevel at its forward end, so that the upper half of this end of the drum terminates in rear of the plane of the rear flue sheet, while the lower half of this part of the tube is reduced to a semi-circular trough-like or channeled portion 39 which extends through the rear flue sheet into the barrel. This construction provides for a proper projection of the drum into the barrel and a firm anchoring of the forward end of the drum in the rear flue sheet and barrel, so as to obtain a very staunch and rigid construction of the forward part of the fire-box, while at the same time providing for a proper reduction in size of the drum at this point in view of the reduced size of the barrel with respect to the size of the fire-box. Within the barrel the reduced extremity 39 of the drum 6 is joined to a similarly shaped trough extension 40 firmly fastened to the drum and walls of the barrel, the abutting ends of the parts 39 and 40 being lapped by a reinforcing or joint plate 41, the parts being welded and riveted together. It is to be understood that the drum and its extension may be made in two pieces, as described, or may be formed as a single piece.

The drum is reinforced at its top by inner and outer longitudinally extending reinforcing plates 42 and 43 riveted thereto. The inner plate 43 terminates in rear of the forward edge of the top part of the drum, and is scarfed and welded, as at 44, to a reducing liner or lap plate 45, which is riveted to the drum and the forward part of which terminates in a partly circular extremity 45′ forming with the underlying reduced part of the drum a drum portion of circular cross-section and reduced diameter with respect to the drum body, which reduced circular portion of the drum passes through and seats within a correspondingly shaped seat flange 46 formed on the back flue sheet 2. This flange 46 extends forwardly or in the direction toward the barrel instead of rearwardly and into the fire-box, for the purpose of providing a seat flange which will be removed from the direct heat of the fire-box. By thus turning this flange forwardly and away from the fire-box, I eliminate the fire cracks which result when two thicknesses of metal are in direct contact with the intense action of the fire. This flange 46, however, is not in direct contact with the drum. Disposed between the flange and drum is a caulking liner 47 of relatively thin metal, which may be readily driven in to caulk up or close the opening between the drum and flange without injury to the metal of either the flange or the drum, and which will allow proper contraction and expansion of these parts to the same or different degrees while keeping the connection absolutely tight. The upper part of the rear end of the barrel jacket 48 is cut away at an angle similar to the upper portion of the forward end of the drum and closed by a reducing cover plate or liner 49 similar to the plate or liner 45 riveted or welded thereto, and these liners or lap plates form supports for and are overlapped by a joint or bridge plate 50. This joint or bridge plate is of elliptical form in plan, and transversely curved or saddle-shaped in cross-section, and is longitudinally curved to provide arcuate front and rear portions 51 and 52, the former extending on the arc of a circle of less diameter than the latter to conform to the differences in dimensions and height between the ends of the drum and barrel joined thereby. The bridge plate is fastened by riveting along its margins to the boiler shell and drum plates and between its portions 51 and 52 the plate is bent at an angle to provide the angularly disposed attaching flanges or wings 53 which are riveted to the rear tube sheet. By this construction the opening which would otherwise exist between the forward end of the drum and the boiler shell is closed and the construction of the bridge plate and the parts which it engages made such as to firmly connect these parts of the boiler and to stiffen and strengthen the entire rear water tube section of the boiler, and particularly those parts at the juncture of the fire-box and barrel, where stiffness and strength are desirable.

By the construction of the fire-box above described I am enabled to reduce the number of drums employed in the top of the fire-box to a single drum, thus avoiding the necessity of the use of fire-brick closures to cover the spaces between drums where a plurality of drums are used, and the objections thereto, as above explained, and at the same time I am enabled to provide a simpler, stronger and more durable type of fire-box, without sacrifice of steam generating and water circulating efficiency, but rather, on the other hand, with a decided increase in the water circulation efficiency and steam generating capacity of the boiler. This is due to the fact that there are less heat losses and that a concentration of the heat and better heat transfer are obtained, notwithstanding the reduction in the number of drums, with reduced resistance to circulation, allowing a better and more rapid circulation of the water; the described arrangement of the upper headers and their direct connection with the sides of the single drum ensuring a very rapid and violent circulation of the water between the headers and the drum. This ensures a highly efficient breaking up of the water in the vertical circulating tubes into relatively small particles, each surrounded by a relatively large effective heating surface, whereby very quick steaming is obtained, and such violent circulation in turn acts as a safety factor, as the part of the drum (equivalent to the crown sheet of an ordinary boiler) in contact with the fire, will always be covered with water even though the water level in the boiler itself should actually fall below the water level of the water in the bottom of the drum, as the water will be forced upward by violent circulation.

The following tabulation shows the comparison of the heating surface in square feet and the evaporation in pounds of water per hour of a similar boiler designed for the same locomotive but having a conventional fire-box with the usual stay bolted surfaces. It will be noted by studying these figures that the fire-box evaporation has been increased 120% in this new and improved water tube boiler, and that this has been done without increasing the grate area of the boiler.

| Class of engine | Tubes | | Firebox | | Total |
|---|---|---|---|---|---|
| | Heating surface, sq. ft. | Evaporation, lbs. water per hour | Heating surface, sq. ft. | Evaporation, lbs. water per hour | Evaporation, lbs. water per hour |
| P-1 | 3708 | 33013 | 228 | 12540 | 45553 |
| P-9a | 4002 | 33476 | 503 | 27675 | 61151 |

Also it will be evident from the foregoing that the fire-box and barrel structure described reduces the number of parts in the boiler to a material extent over a boiler using two or more water drums, thus decreasing the building and maintenance cost not only in amount of material but in the amount of time for labor, and similarly reducing the amount of repairs and time required for repairs in keeping the locomotive in working order. The saving resulting in preventing fire cracking of the drum seat flange on the rear flue sheet, and the provision of the front cab sheet and supporting sheet at the front of the fire-box, in enabling parts to be more readily and quickly assembled and disassembled, with a reduction in number of parts requiring to be disassembled in making particular repairs, is of material importance not only from the standpoint of money outlays, but also in keeping the locomotive out of the shop and in prime running condition. The arrangement of the upper headers in this construction between the side walls of the fire-box and the sides of a single drum not only ensures the use of headers of as generous size as required, but their arrangement wholly within the plane of the side walls, so that these parts will be effectually protected at all times against possible damage by exposure and being struck by extraneous objects. This arrangement furthermore allows the side vertical tubes to be rolled at the top and at the bottom by simply removing the plugs in the access openings in the top and bottom headers, and by simply removing said plugs the tubes may be readily cleaned by a workman standing on the running board of the locomotive. In cleaning and washing the tubes this arrangement is important, as all the tubes can be washed and cleaned within a few hours' time, and without waiting for the boiler to cool, whereas heretofore, in ordinary types of locomotives, this operation has required a period of a number of days, during which time the locomotive is a non-productive property, so that this feature alone is one of material importance to a railroad.

Having thus fully described my invention, I claim:—

1. In a locomotive, a back flue sheet, a fire-box, a barrel, a drum in the fire-box having the upper portion of its forward end cut away at a downward and forward angle and forming a reduced partly cylindrical lower portion extending through said back flue sheet into the barrel, the rear end of the barrel jacket being similarly cut away at a downward and rearward angle, and means fastened to the flue sheet, barrel jacket and drum and covering the gap between the cut away parts of the two last-named elements.

2. In a locomotive, a back flue sheet, a fire-box, a barrel, a drum in the fire-box having the upper portion of its forward end cut away at a downward and forward angle and forming a partly cylindrical reduced lower portion extending through said back flue sheet into the barrel, the rear end of the barrel jacket being similarly cut away at a downward and rearward angle, a trough in the barrel secured to the reduced end of the drum and forming a continuation thereof, and means fastened to the flue sheet, barrel jacket and drum and covering the gap between the cut away parts of the two last-named elements.

3. In a locomotive, a back flue sheet, a fire-box, a barrel, a drum in the fire-box having the upper portion of its forward end cut away at a downward and forward angle and forming a reduced partly cylindrical lower portion extending through said back flue sheet into the barrel, the rear end of the barrel jacket being similarly cut away at a downward and rearward angle, a flange projected forward from the flue sheet and forming a seat for the reduced end of the drum, and means fastened to the flue sheet, barrel jacket and drum and covering the gap between the cut away parts of the two last-named elements.

4. In a locomotive, a back flue sheet, a fire-box, a barrel, a drum in the fire-box having the upper portion of its forward end cut away at a downward and forward angle and forming a reduced partly cylindrical lower portion extending through said back flue sheet into the barrel, the rear end of the barrel jacket being similarly cut away at a downward and rearward angle, a flange projected forward from the flue sheet and forming a seat for the reduced end of the drum, a caulking liner between the flange and drum, and means fastened to the flue sheet, barrel jacket and drum and covering the gap between the cut away parts of the two last-named elements.

5. In a locomotive, a back flue sheet, a fire-box, a barrel, a drum in the fire-box having the upper portion of its forward end cut away at a downward and forward angle and forming a reduced partly cylindrical lower portion extending through said back flue sheet into the barrel, the rear end of the barrel jacket being similarly cut away at a downward and rearward angle, reducing lap plates secured to the cutaway ends of the drum and barrel, and a bridge plate secured to said lap plates and covering the gap between the same.

6. In a locomotive, a back flue sheet, a fire-box, a barrel, a drum in the fire-box having the upper portion of its forward end cut away at a downward and forward angle and forming a reduced partly cylindrical lower portion extending through said back flue sheet into the barrel, the rear end of the barrel jacket being similarly cut away at a downward and rearward angle, reducing lap plates secured to the cut away ends of the drum and barrel, and a saddle-shaped bridge plate secured to said lap plates and having angularly bent portions fastened to the flue sheet.

7. In a locomotive boiler, a firebox including front and rear walls, a row of vertical circulating tubes extending longitudinally of the firebox at each side thereof, side walls, cover sheets at each side of the firebox spaced from the rows of tubes and from the side walls, insulating material between the rows of tubes and cover sheets, insulating material between the side wall and cover sheet at each side of the boiler, and vertical transverse sheets closing the spaces at the front and rear of the firebox between the cover sheets and side walls and tying said cover and side wall sheets to each other and to the front and rear firebox walls.

8. A locomotive boiler having a door sheet, a backhead, hollow side walls formed of spaced sheets, insulating material filling the hollow walls, and a supporting sheet uniting the door sheet and side walls and closing the spaces at the rear of said side walls between the sheets thereof, said supporting sheet projecting marginally beyond the backhead so as to serve as a permanently attached cab front sheet to which the cab may be attached.

9. In a locomotive boiler, a firebox including a rear flue sheet, a door sheet and side walls, each side wall embodying upper and lower longitudinally extending beams, sheet supporting stays extending between said beams, inner and outer wall sheets supported by the beams and stays and arranged to provide insulating spaces therebetween, insulating material between said sheets, front and rear vertical transverse sheets closing the ends of said insulating spaces and connecting the said inner and outer wall sheets to each other and to the rear flue and door sheets, and steam generating and water circulating means including a row of water circulating tubes adjacent the side walls at each side of the firebox and upper and lower headers connecting said tubes and fastened to said beams.

10. In a locomotive boiler, a firebox including a rear flue sheet, a door sheet and side walls, each side wall embodying upper and lower longitudinally extending beams, sheet supporting stays carried by said beams, inner and outer wall sheets supported by the beams and stays and arranged to provide insulating spaces therebetween, insulating material between said sheets, a reinforcing steel netting between each inner side wall sheet and the adjacent row of tubes, reinforced insulating material between the inner side wall sheet and netting and investing the latter, front and rear vertical transverse supporting sheets uniting the wall sheets with the rear flue and door sheets and closing the insulating spaces between the wall sheets at the front and rear of the firebox, and steam circulating and water circulating means including a row of water circulating tubes lining the side walls at each side of the firebox, upper and lower headers connecting said tubes and fastened to the beams, and a longitudinally extending drum disposed between the upper headers and communicating therewith and supported in part by said transverse supporting sheets.

11. In a locomotive boiler, a firebox including a rear flue sheet, a door sheet and side walls, each side wall embodying upper and lower longitudinally extending beams, sheet supporting strips carried by said beams, inner and outer wall sheets supported by the beams and strips and arranged to provide insulating spaces therebetween, insulating material between said sheets, front and rear vertical transverse supporting sheets uniting the wall sheets with the rear flue and door sheets and closing the insulating spaces between the wall sheets at the front and rear of the firebox, steam generating and water circulating means including a row of water circulating tubes adjacent the side walls at each side of the firebox and upper and lower headers connecting said tubes and fastened to said beams, and a longitudinally extending steam generating drum disposed between the upper headers and communicating therewith.

12. In a locomotive boiler, a firebox including a rear flue sheet, a door sheet and side walls, each side wall embodying a wall supporting frame including upper and lower longitudinally extending beams and outer and inner sheets arranged to form an insulating space therebetween, front and rear vertical transverse supporting sheets uniting the wall sheets with the rear flue and door sheets and closing the insulating spaces between the wall sheets at the front and rear of the firebox, and steam generating and water circulating means including a row of water circulating tubes adjacent the side walls at each side of the firebox, upper and lower headers connecting said tubes and fastened to said beams, and a longitudinally extending steam generating drum disposed between the upper headers and communicating therewith.

13. In a locomotive, a firebox including front and rear walls, a crown sheet, side walls each embodying inner and outer sheets arranged to form an insulating space, water circulating and steam generating means in the firebox including upper headers arranged adjacent to the crown sheet to form an insulating space therebetween, a barrel, insulating material in said insulating spaces, said water circulating and steam generating means also including a drum arranged between said upper headers and extending forwardly beyond the firebox into the barrel, a vertical transverse sheet uniting said rear wall and the crown and side wall sheets and closing said insulating spaces at the rear of the firebox, and a vertical transverse sheet uniting said front wall and the crown and side wall sheets and partly supporting said drum and closing said insulating spaces at the front of the firebox.

14. In a locomotive, a firebox including front and rear walls, a crown sheet, side walls each embodying inner and outer sheets arranged to form an insulating space, water circulating and steam generating means in the firebox including upper headers arranged adjacent to the crown sheet to form an insulating space therebetween, insulating material in said insulating spaces, a barrel, the said water circulating and steam generating means also including a drum arranged between said upper headers and extending forwardly beyond the firebox into the barrel, and a vertical transverse sheet uniting said front wall and crown and side wall sheets and closing the insulating sheets between the side wall sheets and about the drum at the front of the firebox.

15. In a locomotive, a throat sheet, a back flue sheet, a firebox, a barrel having its rear end fitted at its lower portion in the throat sheet, water circulating and steam generating means in the firebox including a central longitudinally extending drum projecting at its front end through said back flue sheet, the upper portions of the said rear end of the barrel and front end of the drum being cut away obliquely on relatively converging lines, and a saddle shaped bridge plate shaped to form transverse curved portions extending on arcs of different radii and united to and closing the space between such ends of the barrel and drum, said plate having portions bent at an angle to its aforesaid portions and fastened to the back flue sheet.

16. In a locomotive, a throat sheet, a back flue sheet, a firebox, a barrel having its rear end fitted at its lower portion in the throat sheet, water circulating and steam generating means in the firebox including a central longitudinally extending drum projecting at its front end through said back flue sheet, the upper portions of the said rear end of the barrel and front end of the drum being conformably cut away obliquely on relatively converging lines to provide a gap for a joint connection therebetween, and a joint plate having portions curved on arcs of different radii to fit such upper portions of the barrel and drum and secured thereto to close said gap.

17. In a locomotive, a throat sheet, a back flue sheet, a firebox, a barrel having its rear end fitted at its lower portion in the throat sheet, water circulating and steam generating means in the firebox including a central longitudinally extending drum projecting at its front end through said back flue sheet, the upper portions of the said rear end of the barrel and front end of the drum being conformably cut away obliquely on relatively converging lines to provide a gap for a joint connection therebetween, and a joint plate having portions curved on arcs of different radii to fit such upper portions of the barrel and drum and secured thereto to close said gap and provided with portions fastened to the back flue sheet.

18. In a locomotive, a throat sheet, a back flue sheet, a firebox, a barrel having its rear end fitted at its lower portion in the throat sheet, water circulating and steam generating means in the firebox including a central longitudinally extending drum projecting through said back flue sheet, said ends of the drum and barrel being conformably cut away at their upper portions to provide a gap therebetween and to provide the drum end at its lower portion with a trough-shaped extension projecting into the barrel, and a joint plate covering said gap and secured to the barrel, drum and back flue sheet.

19. In a locomotive, a throat sheet, a back flue sheet, a firebox, a barrel having its rear end fitted at its lower portion in the throat sheet, water circulating and steam generating means in the firebox including a central longitudinally extending drum projecting through said back flue sheet, said ends of the drum and barrel being conformably cut away at their upper portions to provide a gap therebetween and to provide the drum end at its lower portion with a trough-shaped extension projecting into the barrel, and a joint plate having portions curved on arcs of different radii to fit such upper portions of the barrel and drum and secured thereto to close the gap therebetween.

20. In a locomotive, a throat sheet, a back flue sheet, a firebox including said back flue sheet and having a door sheet, a crown sheet and hollow side walls providing insulating spaces, a barrel having its lower portion fitted in the throat sheet, water circulating and steam generating means in the firebox arranged to form an insulating space between the same and the crown sheet and including a central longitudinal drum projecting at its front end beyond the firebox, the said ends of the drum and barrel being conformably cut away at their upper portions to provide a gap therebetween and to provide said drum end at its lower portion with a trough-shaped extension projecting into the barrel, insulating material in said insulating spaces, a joint plate closing said gap and connecting the barrel, drum and back flue sheet, and vertical transverse supporting plates at the front and rear of the firebox secured to the water sheets and closing the ends of the said insulating spaces.

21. A locomotive boiler having a door sheet, a back head, side walls, and a supporting sheet uniting the door sheet and side walls, said supporting sheet projecting marginally beyond the back head so as to serve as a permanently attached cab front sheet to which the cab may be attached.

In testimony whereof I affix my signature.

GEORGE H. EMERSON.